United States Patent
Sharma et al.

(10) Patent No.: US 10,140,678 B2
(45) Date of Patent: Nov. 27, 2018

(54) SPECIALIZED CODE PATHS IN GPU PROCESSING

(71) Applicant: INTEL CORPORATION, Santa Clara, CA (US)

(72) Inventors: Saurabh Sharma, El Dorado Hills, CA (US); Abhishek Ventakesh, Hillsboro, OR (US); Travis T. Schluessler, Hillsboro, OR (US); Thomas F. Raoux, Mountain View, CA (US); Rahul P. Sathe, Folsom, CA (US); Jon Hasselgren, Bunkeflostrand (SE)

(73) Assignee: INTEL CORPORATION, Santa Clara, CA (US)

( * ) Notice: Subject to any disclaimer, the term of this patent is extended or adjusted under 35 U.S.C. 154(b) by 30 days.

(21) Appl. No.: 15/089,270

(22) Filed: Apr. 1, 2016

(65) Prior Publication Data
US 2017/0178277 A1    Jun. 22, 2017

Related U.S. Application Data

(60) Provisional application No. 62/269,682, filed on Dec. 18, 2015.

(51) Int. Cl.
| | |
|---|---|
| *G06T 1/20* | (2006.01) |
| *G06F 8/41* | (2018.01) |
| *G06F 9/38* | (2018.01) |
| *G06T 15/00* | (2011.01) |

(52) U.S. Cl.
CPC .............. *G06T 1/20* (2013.01); *G06F 8/41* (2013.01); *G06F 9/38* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 6,427,234 B1* | 7/2002 | Chambers | G06F 9/45516 717/140 |
| 2006/0005178 A1* | 1/2006 | Kilgard | G06F 8/443 717/153 |
| 2007/0220525 A1* | 9/2007 | State | G06F 9/4881 718/107 |
| 2014/0253563 A1* | 9/2014 | Koneru | G06T 1/20 345/501 |
| 2016/0042560 A1* | 2/2016 | Chang | G06T 15/80 345/426 |
| 2016/0163015 A1* | 6/2016 | Riguer | G06T 15/005 345/522 |

OTHER PUBLICATIONS

Hasselgren et al., "PCU: The Programmable Culling Unit", ACM Transactions on Graphics, vol. 26, No. 3, Article 92, Jul. 2007, 10 pages.

* cited by examiner

*Primary Examiner* — Xiao Wu
*Assistant Examiner* — Steven Elbinger

(57) ABSTRACT

Techniques to improve graphics processing unit (GPU) performance by introducing specialized code paths to process frequent common values are described. A shader compiler can determine instruction that, during operation, may output a common value and can introduce an enhanced shader instruction branch to process the common value to reduce overall computational requirements to execute the shader.

22 Claims, 18 Drawing Sheets

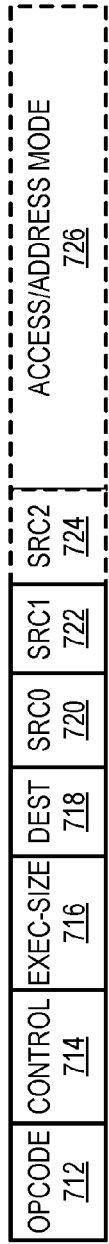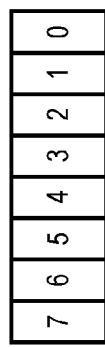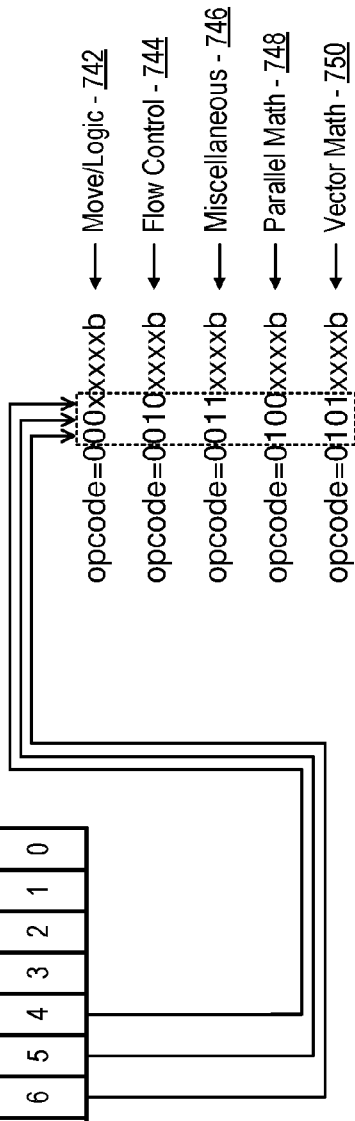
FIG. 7

FIG. 9A   GRAPHICS PROCESSOR COMMAND FORMAT
900
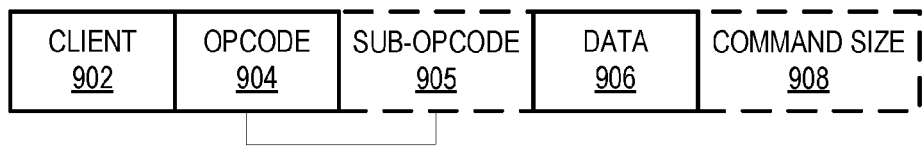
FIG. 9B   GRAPHICS PROCESSOR COMMAND SEQUENCE
910
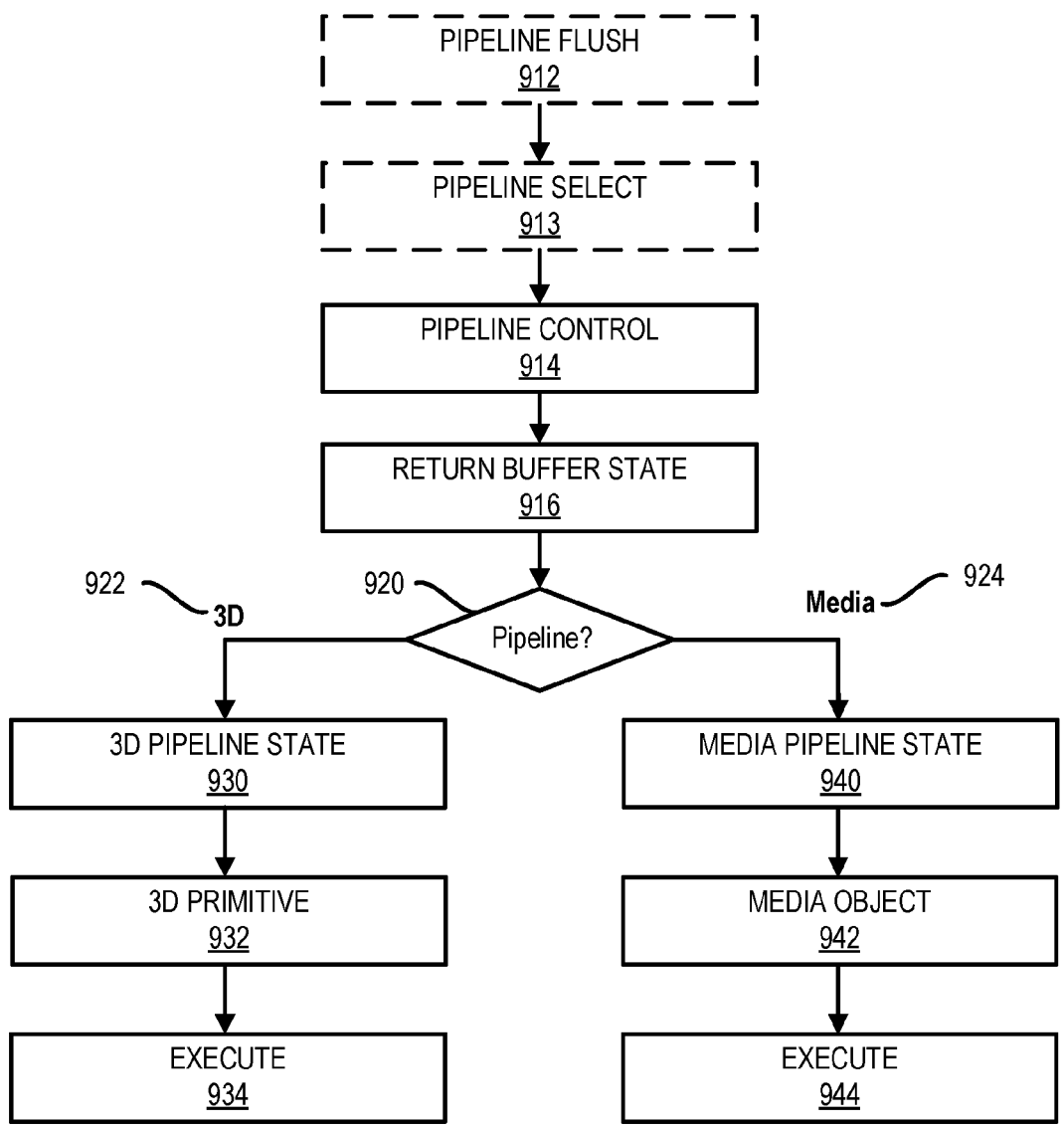

SPECIALIZED CODE PATHS IN GPU PROCESSING

CROSS-REFERENCE TO RELATED APPLICATION

This application claims the benefit of U.S. Provisional Application Ser. No. 62/269,682 filed Dec. 18, 2015, entitled "Specialized Code Paths," which application is incorporated herein by reference in its entirety.

BACKGROUND

A graphics processing unit (GPU), also occasionally called a visual processing unit (VPU), is a specialized electronic circuit designed to rapidly manipulate and alter memory to accelerate the creation of images in a frame buffer intended for output to a display. GPUs are used in embedded systems, mobile phones, personal computers, workstations, and game consoles. Modern GPUs are very efficient at manipulating computer graphics and image processing, and their highly parallel structure makes them more effective than general-purpose CPUs for algorithms where the processing of large blocks of data is done in parallel. In a personal computer, a GPU can be present on a video card, or it can be embedded on the motherboard, in a System-on-Chip, or in certain CPUs, on the CPU die itself.

BRIEF DESCRIPTION OF THE DRAWINGS

FIG. 7 illustrates an embodiment of graphics core instruction formats.

FIGS. 9A and 9B illustrate embodiments of a graphics processor command format.

DETAILED DESCRIPTION

Figure 1:
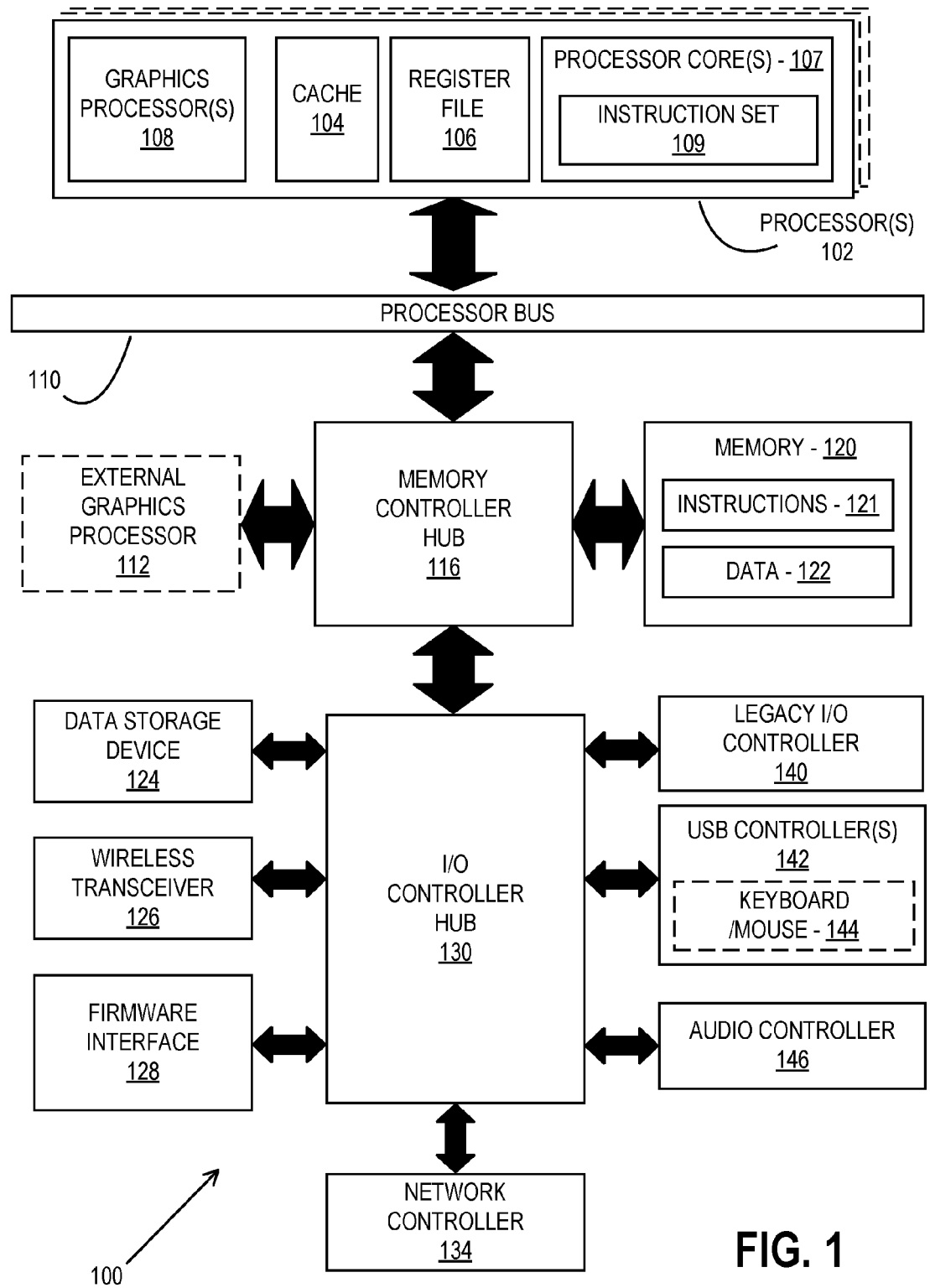
FIG. 1 illustrates an embodiment of an operating environment.

The present disclosure is generally directed to improved graphics processing techniques, and particularly to improved graphics processing techniques implemented by one or more graphics processing unit (GPU) to increase GPU performance, reduce compute cycles, promote efficient use of memory resources, and improve overall user experience when utilizing electronic devices utilizing the one or more GPUs.

One potential bottle neck associated with a GPU is "shader" execution due to, for example, limited compute or memory throughput. A shader is a computer program that is used to do shading, such as the production of appropriate levels of color within an image, produce special effects or perform video post-processing. To increase performance, graphics drivers typically employ a shader compiler to generate enhanced versions of shaders to reduce the number of instructions and memory accesses. Classical optimization techniques include optimizing loops, constant folding and propagation, dead code elimination, and so forth.

The present disclosure provides to improve GPU performance by introducing enhanced code paths in the shader. More specifically, a shader compiler can provision a shader to enhance processing of frequent and/or common values (e.g., zero, one, black & white color values widespread in three dimensional (3D) graphics applications, or the like). It is noted, graphics applications typically read and compute certain common values (e.g., 0.0 f, 1.0 f, black, red, white, etc.). Furthermore, there are a subset of GPU shader instructions that can be monitored to determine where these common values originate. Examples provide enhanced code paths in the shader to determine when common values are to be processed and to increase processing efficiency based on these common values.

As used herein, "common value" can be interpreted as a predetermined value or predetermined values of a set of values. For example, a common value can be a value from a set of values, the set of values to include one or more values. For example, a common value can be a value from a set of values that comprise one and zero. Although examples herein provide the common value, or predetermined value, can be one or zero, examples are not limited in this context.

Embodiments can identify special points in the shader code where common values (e.g., zero, one, or the like) originate. For example, the present disclosure can determine common values are to be processed based on various instructions (e.g., sample_c, mul_sat, add_sat, saturate, sample, or the like). Shader execution following identification of common value processing, or that is, code execution to process these identified common values can be enhanced. For example, the present disclosure can enhance these code section using techniques such as, constant folding, constant propagation and/or dead code removal. It is worthy to note, the present disclosure may introduce some processing overhead. In particular, overhead due to, for example, evaluating the values that flows through specific points to identify the common values and switching between the original code path and the enhanced code path can be introduced. However, this overhead can be mitigated and overall shader execution reduced due to execution of the enhanced code paths.

It is worthy to note, the present disclosure can provide improvements over existing compiler optimization techniques. For instance, one compiler optimization technique attempts to enhance the shader code sequence without any knowledge of the range of outputs. By introducing specialized code paths based on this knowledge about instructions that frequently generate common values, embodiments can improve both performance and efficiency of GPU applications. It is worthy to note, the present disclosure can increase GPU efficiency and reduce shader execution times without merely introducing more gates at the GPU. Furthermore, the present disclosure can increase energy efficiency, that is, potentially provide increased performance per watt as the number of instructions and memory accesses when dealing with frequent common values is reduced.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

FIG. 1 is a block diagram of a processing system 100, according to an embodiment. In general, the processing system 100 can generate and/or execute enhanced shader(s) (e.g., refer to FIG. 10A to 10B and FIGS. 13 to 14) based, in part, on determining common value and inserting enhanced instructions to process the common values (e.g., refer to FIGS. 16 to 17). In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
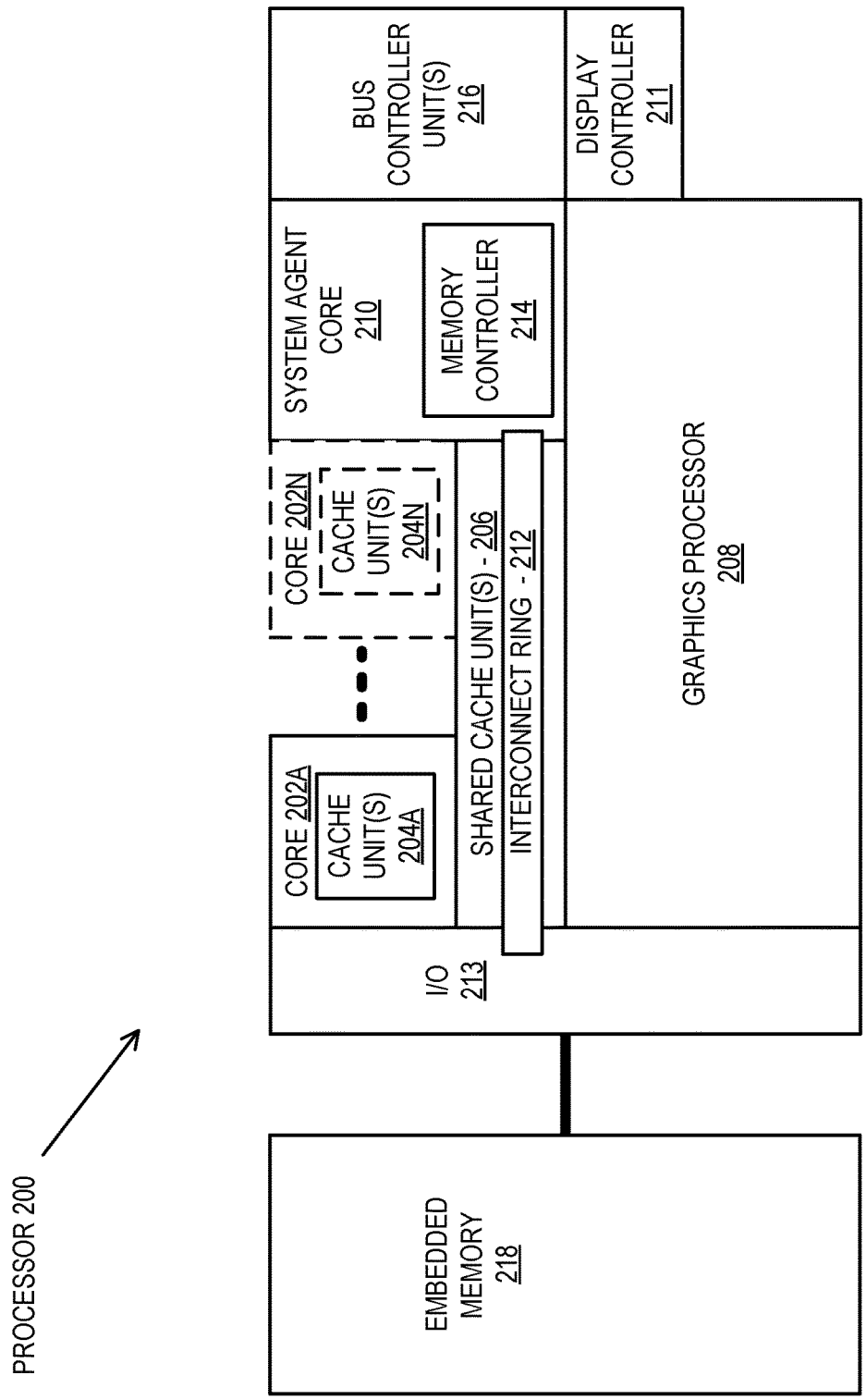
FIG. 2 illustrates an embodiment of processor.

FIG. 2 is a block diagram of an embodiment of a processor 200 having one or more processor cores 202A-202N, an integrated memory controller 214, and an integrated graphics processor 208. In general, the processor 200 can generate and/or execute enhanced shader(s) (e.g., refer to FIG. 10A to 10B and FIGS. 13 to 14) based, in part, on determining common value and inserting enhanced instructions to process the common values (e.g., refer to FIGS. 16 to 17). Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
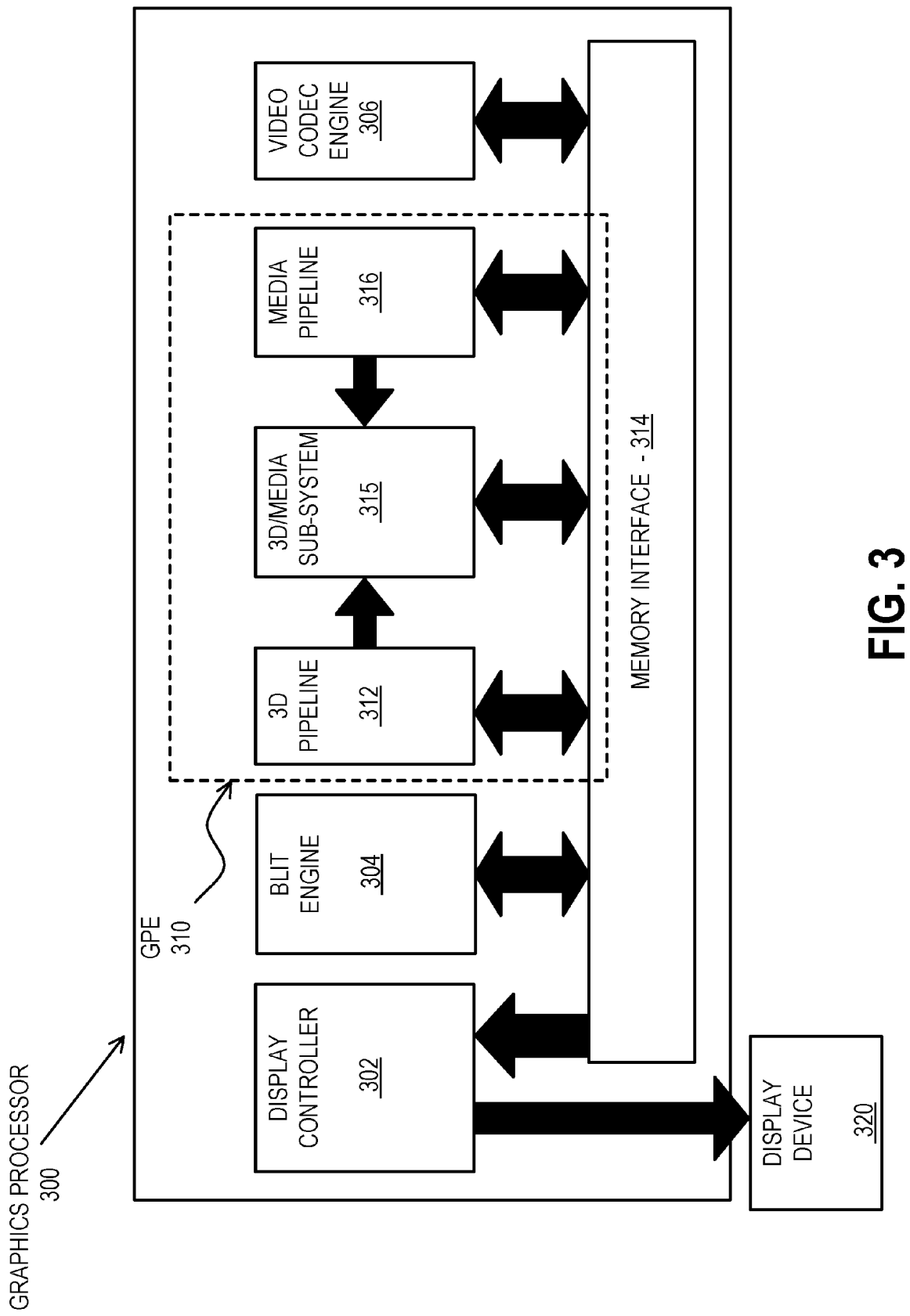
FIG. 3 illustrates an embodiment of a graphics processor.

FIG. 3 is a block diagram of a graphics processor 300, which may be a discrete graphics processing unit, or may be a graphics processor integrated with a plurality of processing cores. In general, the graphics processor 300 can generate and/or execute enhanced shader(s) (e.g., refer to FIG. 10A to 10B and FIGS. 13 to 14) based, in part, on determining common value and inserting enhanced instructions to process the common values (e.g., refer to FIGS. 16 to 17). In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Figure 4:
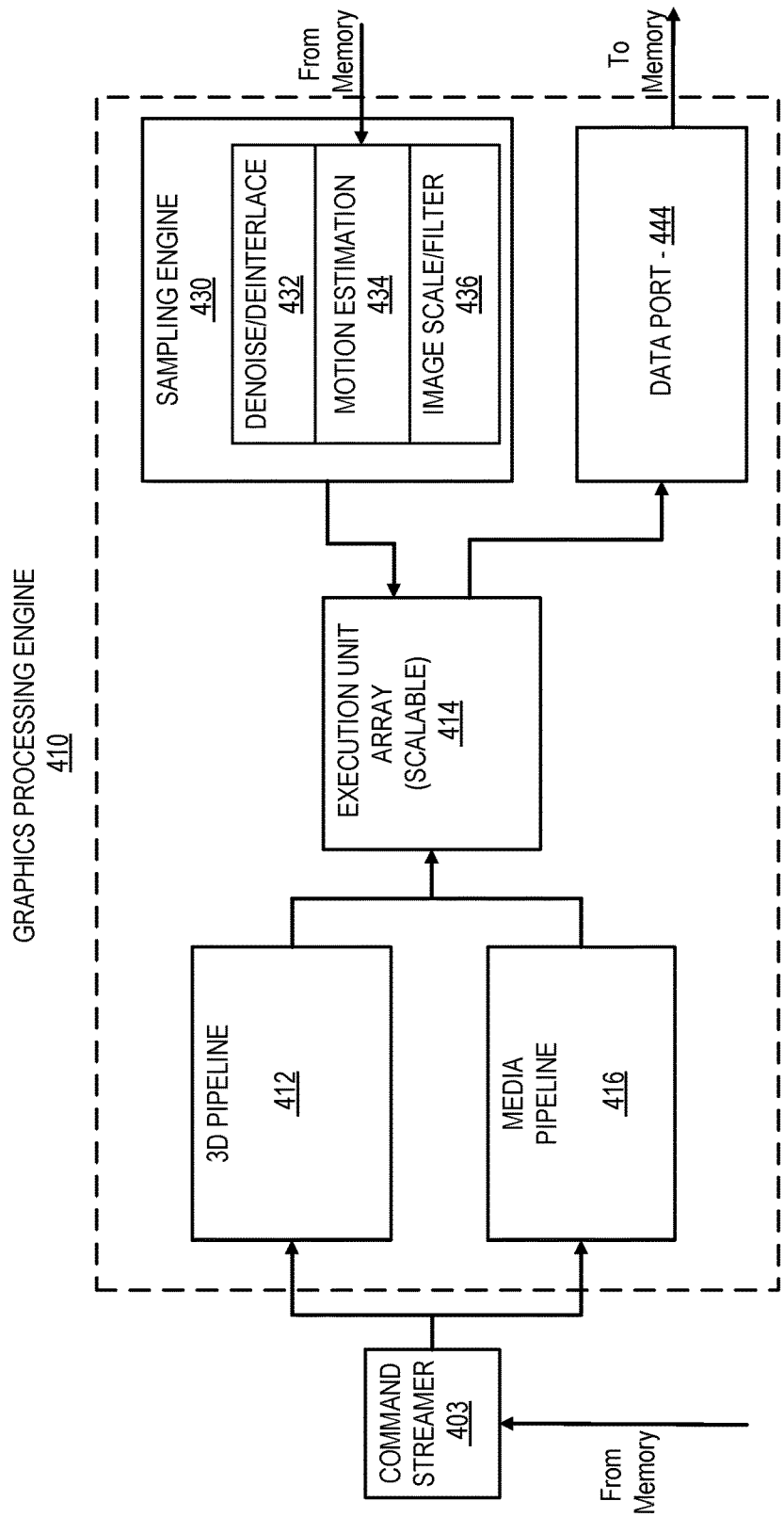
FIG. 4 illustrates an embodiment of a graphics processing engine.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Figure 5:
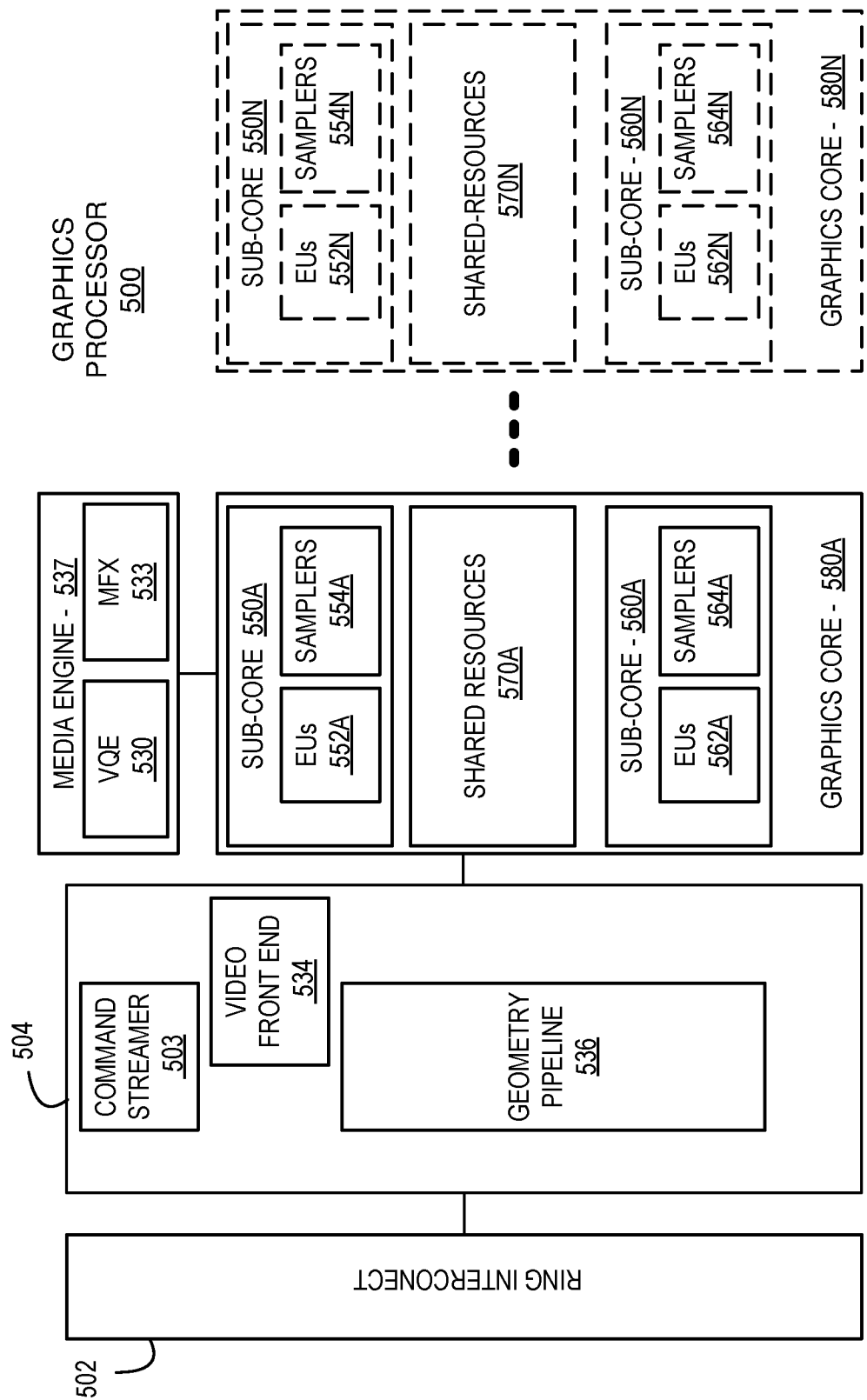
FIG. 5 illustrates an embodiment of a graphics processor.

FIG. 5 is a block diagram of another embodiment of a graphics processor 500. In general, the graphics processor 500 can generate and/or execute enhanced shader(s) (e.g., refer to FIG. 10A to 10B and FIGS. 13 to 14) based, in part, on determining common value and inserting enhanced instructions to process the common values (e.g., refer to FIGS. 16 to 17). Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
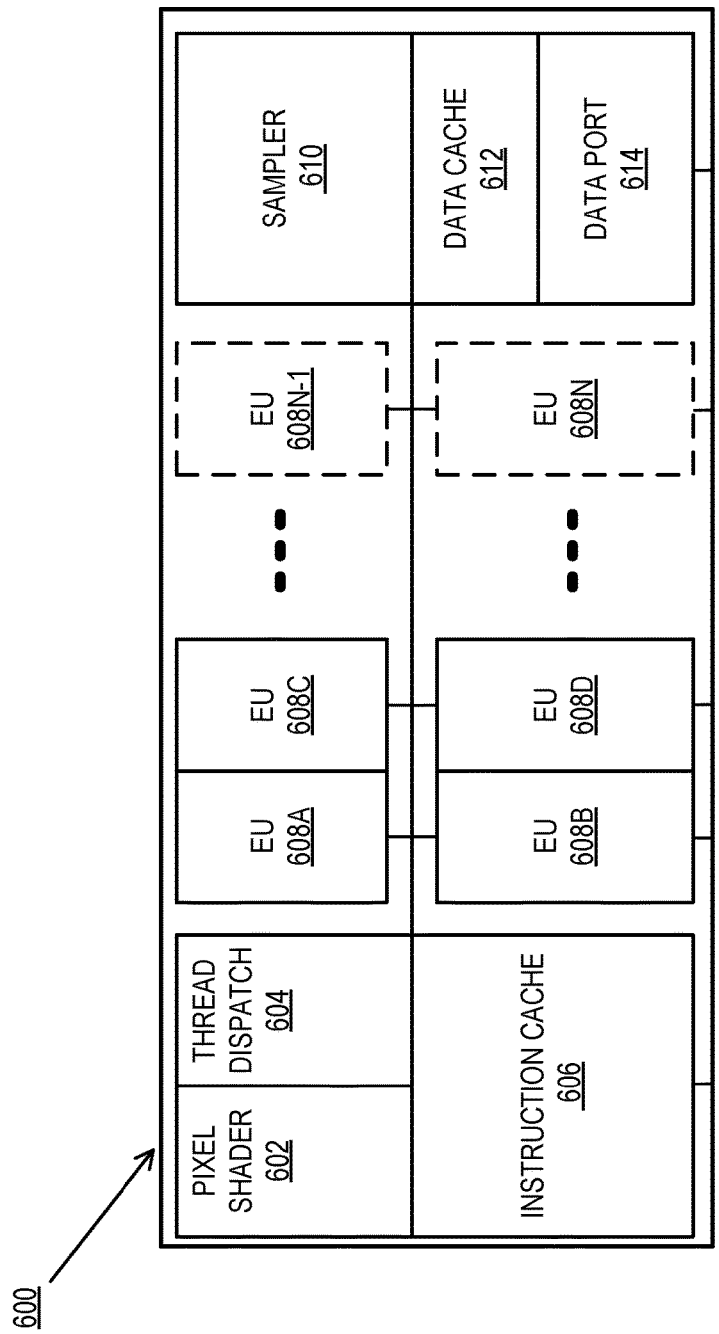
FIG. 6 illustrates an embodiment of a pixel shader.

FIG. 6 illustrates thread execution logic 600 including an array of processing elements employed in some embodiments of a GPE. In general, the thread execution logic 600 can generate and/or execute enhanced shader(s) (e.g., refer to FIG. 10A to 10B and FIGS. 13 to 14) based, in part, on determining common value and inserting enhanced instructions to process the common values (e.g., refer to FIGS. 16 to 17). Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In general, the present disclosure can generate enhanced shader(s) (e.g., refer to FIGS. 16 to 17) based on the example graphics processor instruction formats 700 depicted here. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
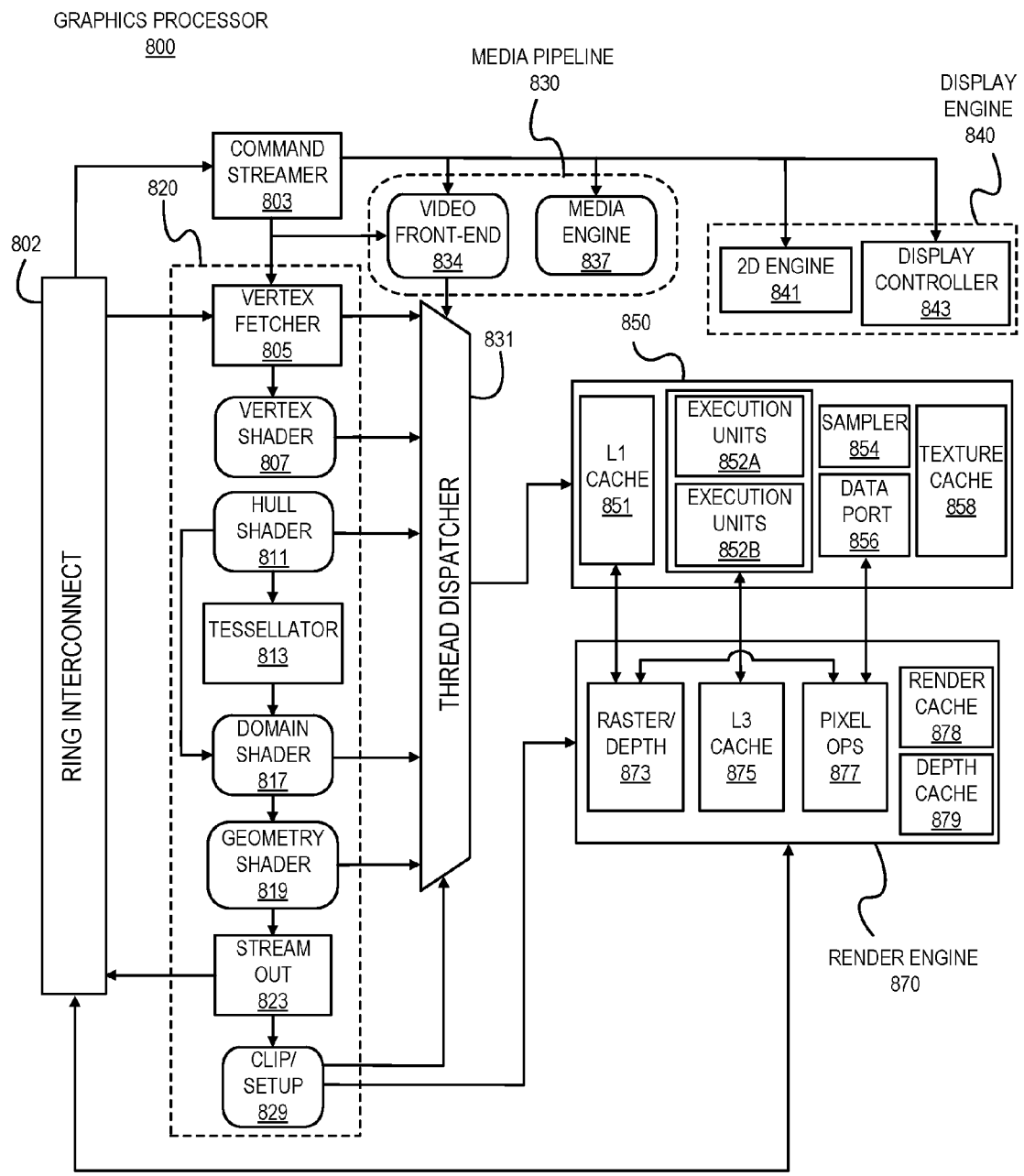
FIG. 8 illustrates an embodiment of a graphics processor.

FIG. 8 is a block diagram of another embodiment of a graphics processor 800. In general, the thread execution logic 600 can generate and/or execute enhanced shader(s) (e.g., refer to FIG. 10A to 10B and FIGS. 13 to 14) based, in part, on determining common value and inserting enhanced instructions to process the common values (e.g., refer to FIGS. 16 to 17). Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer/depth 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access unrasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

FIG. 9A is a block diagram illustrating a graphics processor command format 900 according to some embodiments. FIG. 9B is a block diagram illustrating a graphics processor command sequence 910 according to an embodiment. In general, the depicted command format and sequence can be implemented to process enhanced shader(s) described herein. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Figure 10A:
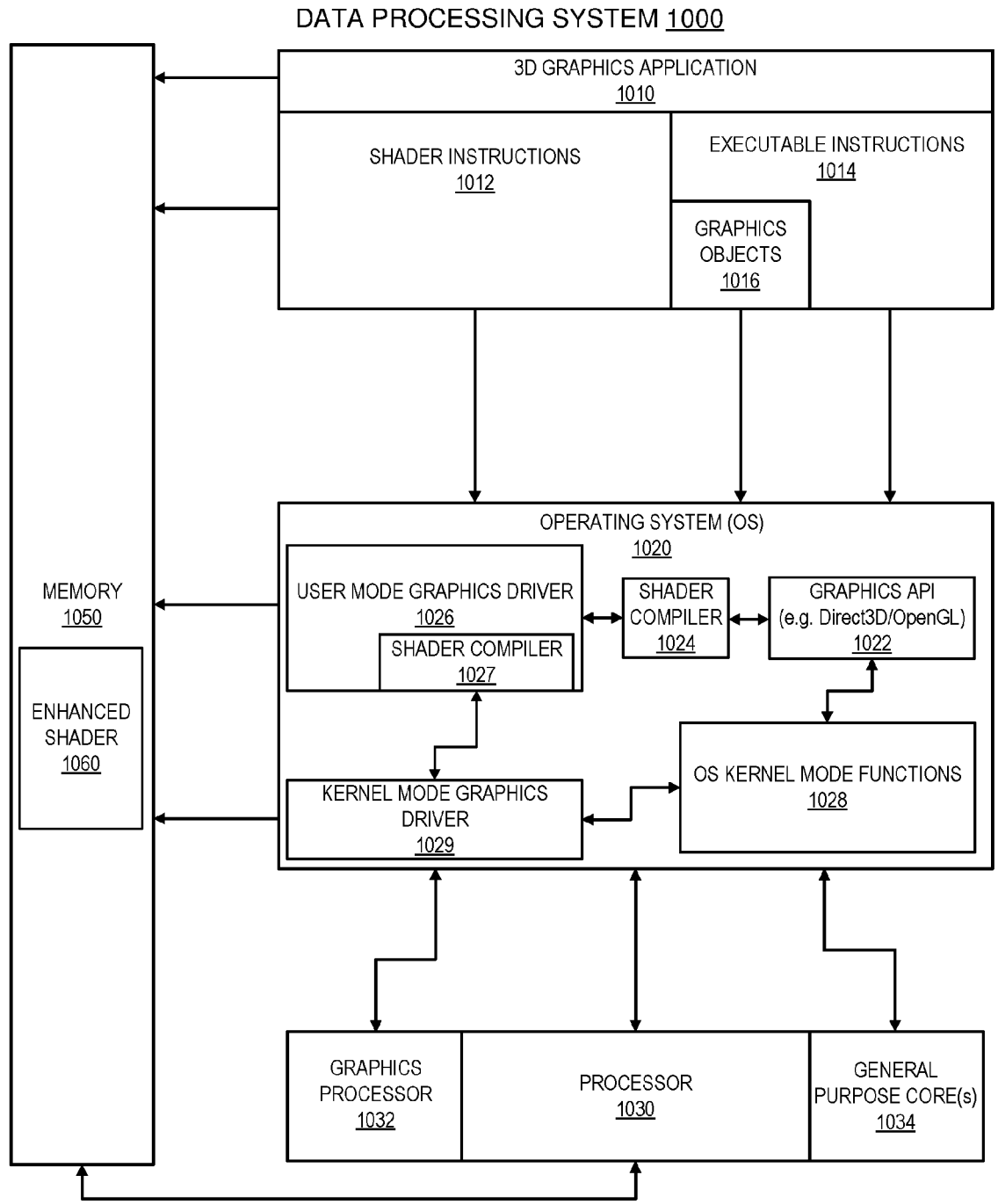
FIGS. 10A and 10B illustrates an embodiment of a data processing system.
Figure 10B:
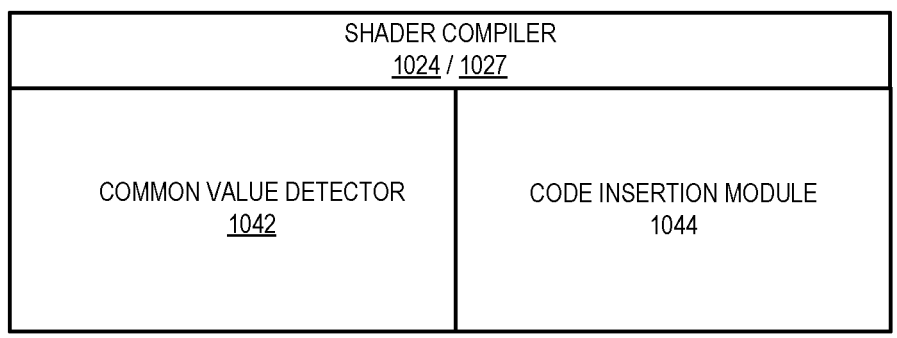

FIGS. 10A and 10B illustrates exemplary graphics software architecture for a data processing system 1000 according to some embodiments. Turning more specifically to FIG. 10A, in some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system. In particular, as described herein, the graphics application 1010 and operating system 1020 can each execute in system memory 1050 to generate and/or execute an enhanced shader 1060. The enhanced shader can include branching and enhanced sequences as described herein (e.g., refer to FIGS. 13 to 14).

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

Turning more particularly to FIGS. 10A and 10B, the front-end shader compiler 1024 and/or the back-end shader compiler 1027 can include a common value detector 1042 and a code insertion module 1044. In general, the shader compiler 1024/1027 can generate the enhanced shader 1060 based on determining points in the shader where common values may be processed and adding common value processing instructions to the enhanced shader 1060. Accordingly, during operation, a GPU (e.g., any one or more of the graphics processors described herein) can execute the enhanced shader 1060. The common value detector 1042 can determine specific points within the shader instructions 1012 where common values may be processed (e.g., refer to FIGS. 15 to 17) and the code insertion module 1044 can add enhanced instructions to process the common values (e.g., refer to FIGS. 15 to 17).

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
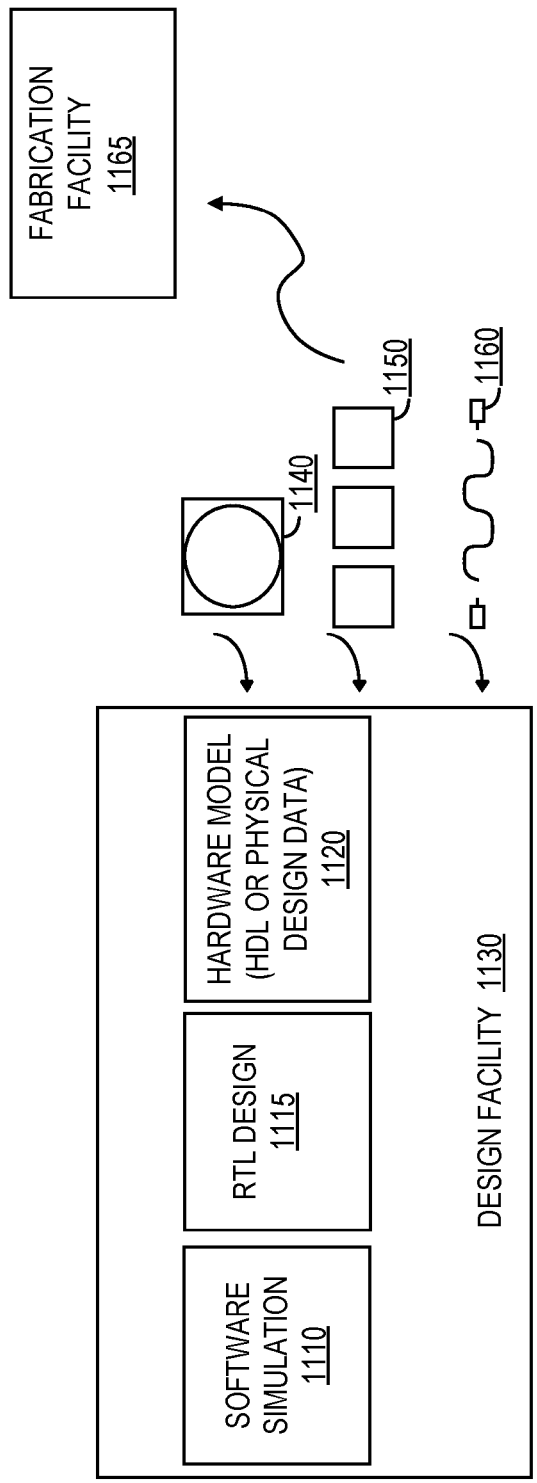
FIG. 11 illustrates an embodiment of an IP core development.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
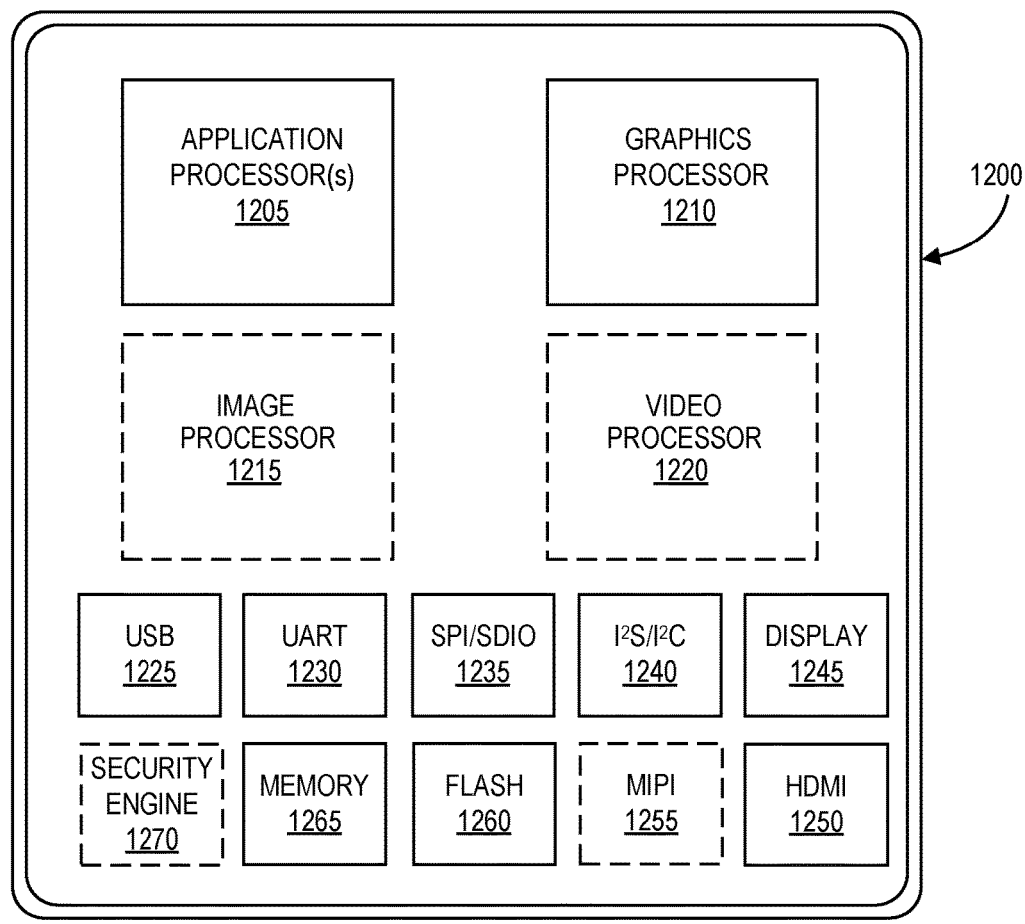
FIG. 12 illustrates an embodiment of an integrated circuit.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Figure 13:
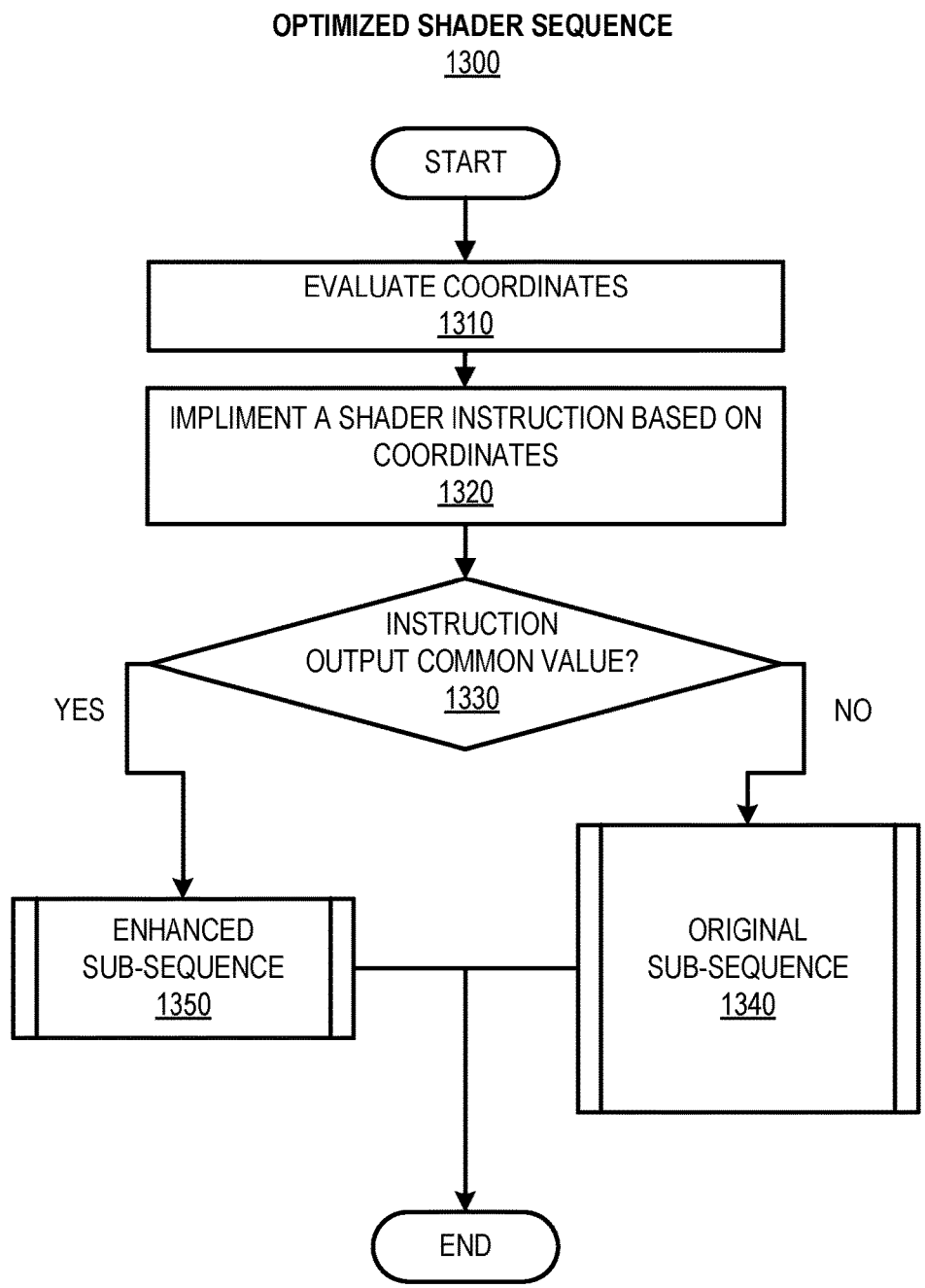
FIG. 13 illustrates an embodiment of a first enhanced shader sequence.
Figure 14:
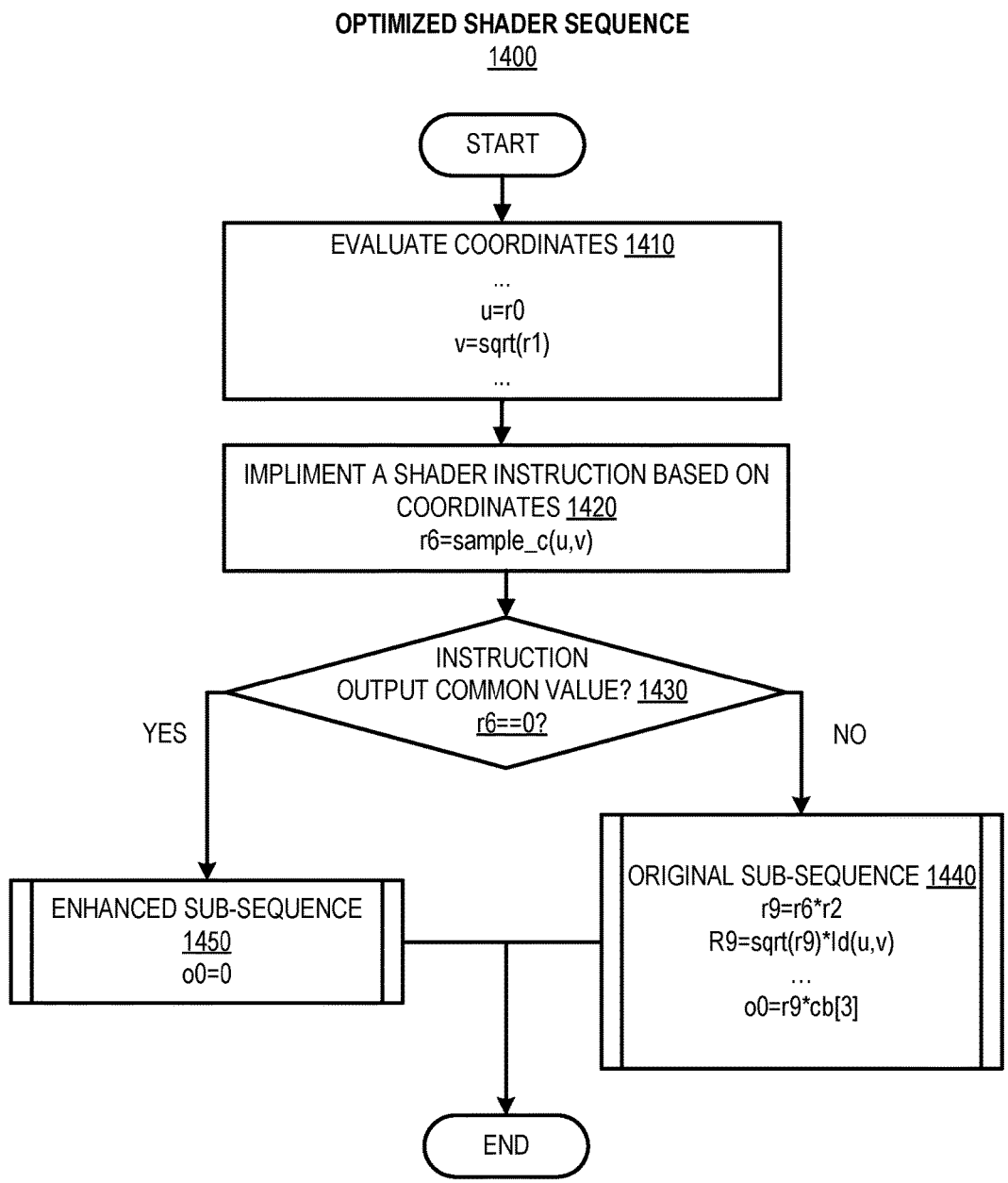
FIG. 14 illustrates an embodiment of a second enhanced shader sequence.

FIGS. 13 and 14 illustrates exemplary enhanced shader sequences 1300 and 1400, respectively; which sequences can be generated and/or executed according to embodiments of the present disclosure. The enhanced shader sequences 1300 and 1400 can correspond to the enhanced shader 1060 depicted in FIG. 10A. Furthermore, it is noted, the sequences 1300 and 1400 are described with reference to the data processing system 1000 of FIGS. 10A to 10B. However, examples are not limited in this context and the sequences 1300 and/or 1400 could be implemented by any graphics processors, such as, the graphics processors described herein, Turning more specifically to FIG. 13, the enhanced shader sequence 1300 is depicted. The enhanced shader sequence 1300 may begin at block 1310. At block 1310 "evaluate coordinates" the graphics processor 1032 can evaluate a coordinate as part of a shading function. For example, as described herein, shaders can perform coordinate space transformations to yield various coordinates (e.g., x, y, z, u, v, or the like) used in implementing shading functions.

Continuing to block 1320 "implement a shader instruction based on the coordinates" the graphics processor 1032 can implement a shader instruction based on the coordinates evaluated at block 1310. It is worthy to note, that in general, the shader instruction implemented at block 1320 can be any shader instruction. However, in some embodiments, the shader instruction implemented at block 1320 can be a shader instruction in which common values (e.g., zero, one, or the like) are routinely output. For example, the following exemplary, but not exhaustive, set of six shader instructions can routinely produce common values (e.g., zero, one, or the like): The saturate instruction, which clamps the specified value within the range of zero to one; the sample_c instruction, which for each comparison that passes returns 1.0 f and for each comparison that fails returns 0.0 f; the mul_sat/add_sat instruction, which multiplies or adds two values and clamp the output within the range zero to one; the ld/sample instruction, which performs a texture lookup; the and instruction, which performs a Boolean AND of two operands and necessarily will return zero when one operand is zero; and the ge/eq/le instructions, which implement a greater than, equal to, or less than function and can return a zero or a one. As noted, these examples are not exhaustive not intended to be limiting but instead given to provide an illustrative disclosure.

As used herein, "shader instruction" can mean a single shader instruction corresponding to a single computational event or can mean a group or collection of shader instructions corresponding to a sequence of events. Examples are not limited in this context.

Continuing to block 1330 "instruction output a common value?" the graphics processor 1032 can determine whether the instruction output equals a common value. For example, the graphics processor can determine whether instruction output equals a zero, one, or the like. From block 1330, the sequence 1300 can continue to either block 1340 or block 1350. In particular, the sequence 1300 can continue from block 1330 to block 1340 based on a determination that the instruction output is not a common value; while the sequence 1300 can continue from block 1330 to block 1350 based on a determination that the instruction output is a common value.

In general, at block 1340 "original sub-sequence" the graphics processor 1032 can execute an original shader sub-sequence" while at block 1350 "enhance sub-sequence" the graphics processor 1032 can execute an enhanced shader sub-sequence. Examples of the original and enhanced sub-sequences are given below for purposes of explanation. Furthermore, examples for determining an enhanced sub-sequence and insertion points in the shader for branches (e.g., block 1330) are also given below. In general, however, the enhanced sub-sequence 1350 can consume and/or require less computing (e.g., graphics processing) resources than the original sub-sequence 1340. Accordingly, in general, the overall sequence 1300 may be more efficiently processed by a graphics processor (e.g., the graphics processor 1032, or the like) than conventional shader sequences due to the efficiencies introduced by processing common values.

Turning more specifically to FIG. 14, the enhanced shader sequence 1400 is depicted. It is noted, that the enhanced shader sequence provides illustrative examples (described in greater detail herein) for each of the depicted individual operations of the sequences. However, these examples are given for illustration only and not to be limiting. In particular, the coordinates and/or variables indicated and the mathematical operations depicted are done so for purposes of explanation only. The sequence 1400 could be implemented using different operations than depicted.

The enhanced shader sequence 1400 may begin at block 1410. At block 1410 "evaluate coordinates" the graphics processor 1032 can evaluate a coordinate as part of a shading function. For example, the graphics processor 1032 can evaluate coordinates u=r0 and v=sqrt(r1).

Continuing to block 1420 "implement a shader instruction based on the coordinates" the graphics processor 1032 can implement a shader instruction based on the coordinates evaluated at block 1310. For example, the graphics processor 1032 can determine r6=sample_c(u,v). As noted above, the sample_c instruction returns either a 1 or a 0.

Continuing to block 1430 "instruction output a common value?" the graphics processor 1032 can determine whether the instruction output equals a common value. For example, the graphics processor can determine whether instruction output equals a zero. More specifically, the instruction output can determine whether r6==0. From block 1430, the sequence 1400 can continue to either block 1440 or block 1450. In particular, the sequence 1400 can continue from block 1430 to block 1440 based on a determination that r6 does not equal zero; while the sequence 1400 can continue from block 1430 to block 1450 based on a determination that r6 does equal zero.

In general, at block 1440 "original sub-sequence" the graphics processor 1032 can execute an original shader sub-sequence" while at block 1450 "enhanced sub-sequence" the graphics processor 1032 can execute an enhanced shader sub-sequence. For example, at block 1440, the graphics processor can determine:

r9=r6*r2 r9=sqrt(r9)*Id(u,v)

o0=r9*cb[3], while, at block 1450 the graphics processor can determine o0 equals 0. Accordingly, in general, the overall sequence 1400 may be more efficiently processed by a graphics processor (e.g., the graphics processor 1032, or the like) than conventional shader sequences due to the efficiencies introduced by the enhanced sub-sequence 1450 executed when r6 equals zero.

Figure 15:
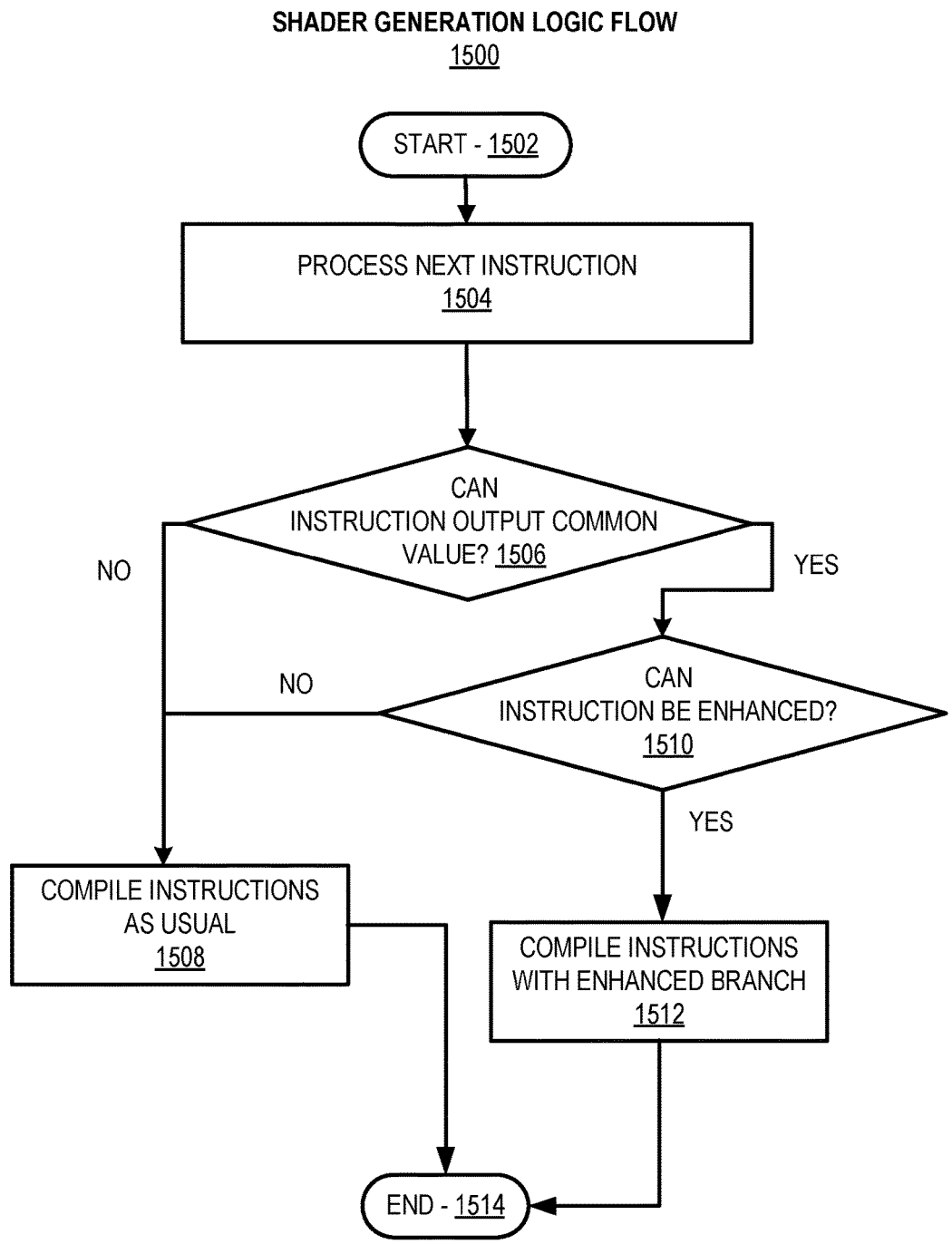
FIG. 15 illustrates an embodiment of a first logic flow.
Figure 16:
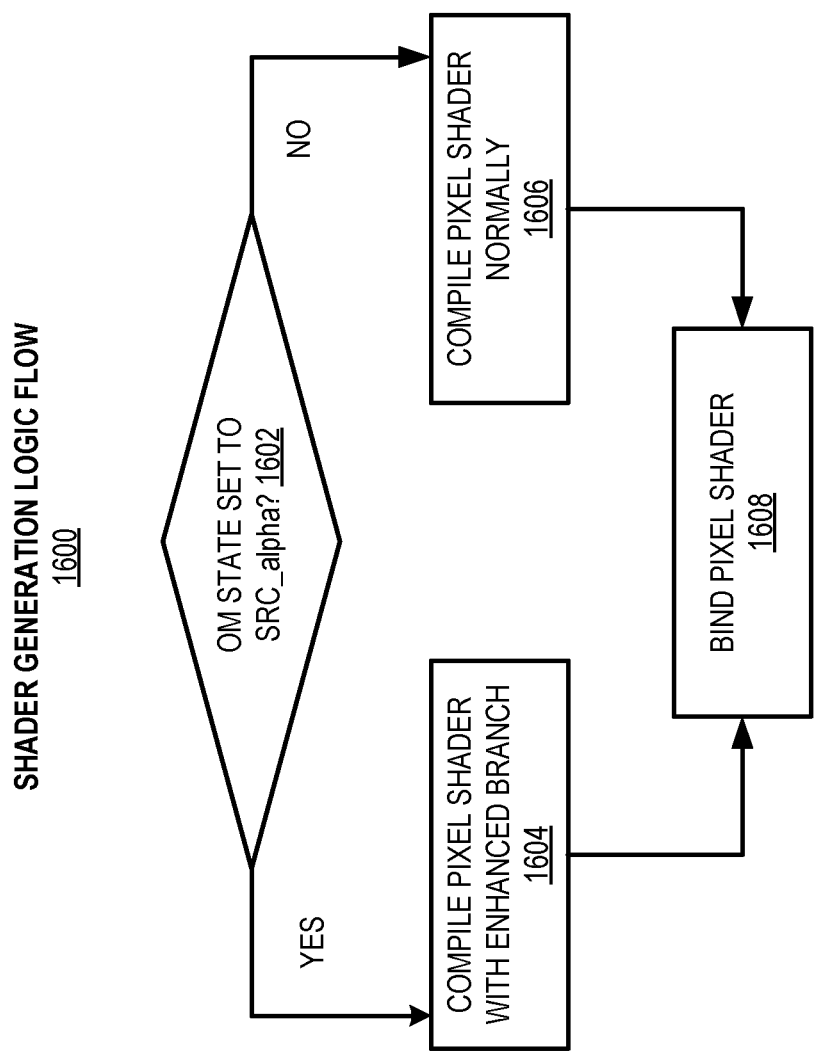
FIG. 16 illustrates an embodiment of a second logic flow.
Figure 17:
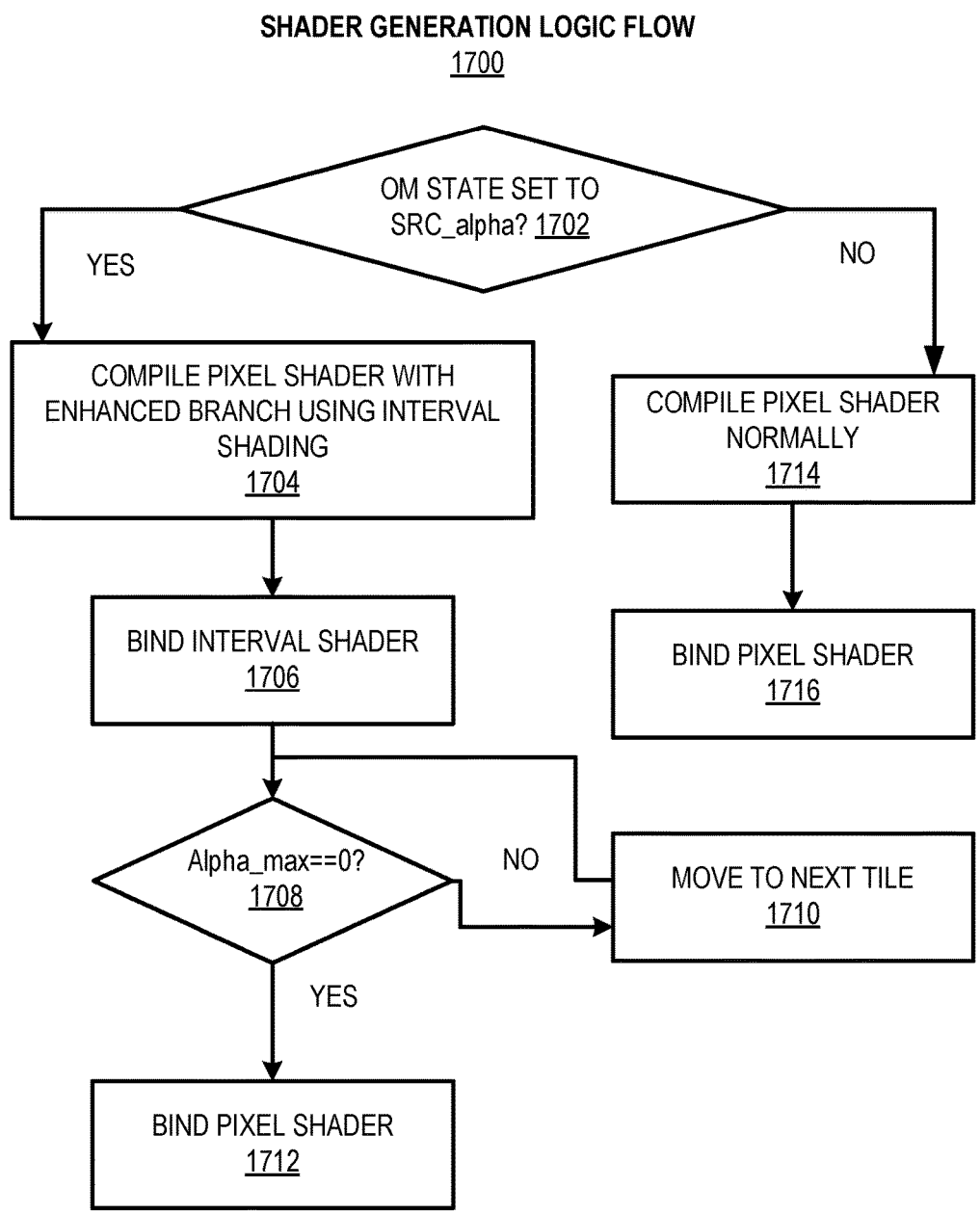
FIG. 17 illustrates an embodiment of a third logic flow.

FIGS. 15 to 17 illustrate example logic flows to determine an enhanced shader including an enhanced shader sequences (e.g., 1300, 1400, or the like) according to embodiments of the present disclosure. In general, any shader compiler can implement the depicted logic flows to generate an enhanced shader. However, examples are described herein in conjunction with the shader compiler 1024 and the enhanced shader 1060 for illustration purposes only. This is not to be limiting.

Turning more specifically to FIG. 15, which illustrates a logic flow 1500. The shader compiler 1024 can implement logic flow 1500 to generate enhanced shader 1060. In general, the shader compiler 1024 in implementing logic flow 1500 analyzes an input shader at multiple steps to see if it can produce common values (e.g., zero, one, or the like) and generates an enhanced sub-sequence (e.g., sub-sequence 1350, 1450, or the like) for the steps that can produce a common value.

Logic flow 1500 can begin at block 1502. At block 1502, operations to compile a pixel shader are initiated. Continuing to block 1504 "process next instruction," shader compiler 1024 can process a next instruction for the pixel shader. For example, shader compiler 1024 can process a next instruction from the shader instructions 1012.

Continuing to decision block 1506 "can instruction output a common value?" the shader compiler can determine whether the instruction can output a common value (e.g., zero, one, or the like). From decision block 1506, the logic flow 1500 can continue to either block 1508 or decision block 1510. In particular, the logic flow 1500 can continue from decision block 1506 to block 1508 based on a determination that the instruction cannot output a common value while the logic flow 1500 can continue to decision block 1510 based on a determination that the instruction can output a common value.

At block 1508 "compile instructions as usual," the shader compiler 1024 can compile the shader instructions 1012 as usual (e.g., conventionally, without enhanced branching, or the like). At decision block 1510 "can instruction be folded?" the shader compiler 1024 can determine whether the instruction that can output a common value can be enhanced (e.g., folded, or the like). From decision block 1510, the logic flow 1500 can continue to either block 1508 or block 1512. In particular, the logic flow 1500 can continue from decision block 1510 to block 1508 based on a determination that the instruction cannot be enhanced while the logic flow 1500 can continue to block 1512 based on a determination that the instruction can be enhanced.

At block 1512 "compile instructions with enhanced branch," the shader compiler 1024 can compile the shader instructions with an enhanced branch where the instructions output is a common value (e.g., the sequence 1300, 1400, or the like).

In some examples, at decision block 1510, the shader compiler 1024 can determine whether the instruction can be "significantly" enhanced, or whether more than a threshold number of instructions can be folded and/or enhanced to introduce above a threshold level of efficiency into the overall shader processing.

In some examples, the shader compiler 1024 can restricts the number of optimizations (e.g., enhanced sub-sequences 1350, 1450, or the like) to less than a threshold number to control the overhead of branching introduced as a result of the optimization. In some examples, the shader compiler 1024 can, if possible, predicate the shader instructions following the instruction that can output a common value.

It is noted, graphics application program interfaces (APIs) (e.g., Direct3D11 (D3D11), or the like) can enable rendering of translucent objects with the use of a pipeline stage called an OM stage. Typically, OM uses the colors at sample locations in the frame buffer (dest) and blends them with the color generated as a result of pixel shading (src) and blends them using the OM state. To achieve this, OM fetches the data from the destination to do the blending and writes out the newly calculated color (after blending) to the render target. This read-modify-write operation can be expensive from a power point of view.

Current shader compilers, however, typically do not enhance code generation for a particular value of an OM state. So when an OM state is set to a src_alpha (or "over") operator, even if the src_alpha is zero, the pixel shader still executes to evaluate src_color. Similarly, workloads can be constructed for testing other cases as well.

FIGS. 16 to 17 depicts logic flows 1600 and 1700, respectively, to enhance shader instructions to reduce and/or or omit read/write operations depending on the OM state and an alpha value produced by the shader. It is worthy to note, this optimization can reduce bandwidth requirements for executing the shader. In general, the shader instructions used to evaluate color in such situations can be omitted. In particular, the enhanced shader can use a conditional to generate a compiled shader to detect a case when output color is irrelevant (e.g., based on an OM state and/or the src alpha, or the like) and skip the rest of the shader code that calculates the color.

Embodiments may implement a graphics driver stack designed to compile the pixel shader regardless of a particular OM state. Such a graphics driver stack may not try to enhance or generate code for certain state combinations that occur frequently. For example, modern video games often set an OM state to use what is commonly known as the "over" operator, which may be defined by Equation (1) as follows:

$$Destcolor=Srccolor*Srcalpha+(1-Srcalpha)*Dstcolor \quad \text{Equation (1)}$$

As seen in Equation (1), when Srcapha is zero, Dstcolor does not change. In other words, when a pixel that is being rendered is fully transparent, the frame buffer color for that pixel does not change. Embodiments modify the pixel shader compiler to look at the blending operation and generate shader code that first computes the alpha value and skips the code that calculates the color if the alpha value indicates that the final pixel color will not change. If the OM state is set for the "over" operation, also referred to sometimes as a "Source Alpha," the pixel shader compiler generates the code in the following sequence whenever possible:

1. Code that calculates src_alpha;
2. Check if src_alpha==0;
3. If #2 is true, the compiler can return some default value without evaluating the color; and
4. If #2 is false; the compiler generates the code that evaluates the src_color.

Examples of this are provided below with respect to FIGS. 16 to 17.

Turning more specifically to FIG. 16 and the logic flow 1600. The logic flow 1600 performs conditional compilation based on the OM State to skip shading whenever applicable.

Logic flow 1600 can begin at decision block 1602. At decision block 1602 "OM state set to src_alpha?" the shader compiler 1024 can determine whether the OM state is set to src_alpha. From decision block 1602, the logic flow 1600 can continue to either block 1604 or block 1606. In particular, the logic flow 1600 can continue from decision block 1602 to block 1604 based on a determination that the OM state is set to src_alpha while the logic flow 1600 can continue to block 1606 based on a determination that OM state is set to src_alpha.

At block 1604 "compile pixel shader with enhanced branch," the shader compiler 1024 can compile the pixel shader with an enhanced branch. At block 1606 "compile pixel shader normally," the shader compiler 1024 can compile the pixel shader normally (e.g., without an enhanced branch, or the like).

From block 1604 and 1606, the logic flow 1600 can continue to block 1608 "bind pixel shader," the shader compiler 1024 can bind the pixel shader.

It is worthy to note, that logic flow 1600 is described in the context of an "over" operator. However, the logic flow is equally applicable to other cases where output color is determined. For example, without limitation, the logic flow 1600 can be implemented to enhance a shader where: Destcolor=0*Destcolor+SRCalpha*SRCcolor; Destcolor=0*Destcolor+(1−SRCalpha)*SRCcolor (in this case the test to skip the PS would be SRCalpha==1 instead of 0); Destcolor=1*Destcolor+SRCalpha*SRCcolor; Destcolor=1*Destcolor+(1−SRCalpha)*SRCcolor; and Destcolor=SRCalpha*Destcolor+(1−SRCalpha)*SRCcolor (normal blending but with inversed alpha).

As another example, in cases where SRCcolor is multiplied by (1−SRCalpha) during the blending operation, the shader compiler 1024 could generate enhanced shader 1060 to check whether SRCalpha is equal to 1, instead of 0, and skip the shading when it is.

Turning more specifically to FIG. 17 and the logic flow 1700. The shader compiler 1024 can implement logic flow 1700 to reduce and/or omit read or write operations based on an OM state and an alpha value produced by a shader. Furthermore, where an interval compiler is available, the logic flow 1700 can save even more pixel shader dispatches and shading relative to the logic flow 1600. More specifically, the shader compiler 1024 can generate an interval representation of the shader over a tile of pixels (e.g., a n by m block of pixels), and if there is a min/max filtering mode supported by sampler, the min and max src_alpha can be evaluated over the tile of pixels.

As depicted, logic flow 1700 can begin at decision block 1702. At decision block 1702 "OM state set to src_alpha?" the shader compiler 1024 can determine whether the OM state is set to src_alpha. From decision block 1702, the logic flow 1700 can continue to either block 1704 or block 1714. In particular, the logic flow 1700 can continue from decision block 1702 to block 1704 based on a determination that the OM state is set to src_alpha while the logic flow 1700 can continue to block 1714 based on a determination that OM state is set to src_alpha.

At block 1704 "compile pixel shader with enhanced branch using interval shading," the shader compiler 1024 can compile the pixel shader with an enhanced branch using interval shading. In particular, the shader compiler 1024 can determine alpha_min and alpha_max.

Continuing to block 1706 "bind interval shader" the shader compiler 1024 can bind the interval shader (e.g., the shader compiled at block 1704, or the like). Continuing to decision block 1708 "alpha_max==0?" the shader compiler 1024 can determine whether the alpha-max (e.g., for a particular tile) is equal to zero. From decision block 1708 the logic flow 1700 can continue to either block 1710 or block 1712. In particular, the logic flow 1700 can continue from decision block 1708 to block 1710 based on a determination that the alpha_max does not equal zero while the logic flow 1700 can continue to block 1712 based on a determination that alpha_max does equal zero.

More specifically, at blocks 1708, 1710, and 1712, shader compiler 1024 can execute the tile shader instead of running the pixel shaders for all the pixels to determine the alpha_max for an entire tile and bind the interval shader for the tile where the alpha_max equals zero.

At block 1714 "compile pixel shader normally," the shader compiler 1024 can compile the pixel shader normally (e.g., without an enhanced branch, or the like). The logic flow 1700 can continue to block 1716 "bind pixel shader," the shader compiler 1024 can bind the pixel shader.

It is worthy to note, if the alpha_max equals zero (e.g., as determined at decision block 1708, or the like) the shader compiler 1024 can skip launching the pixel shades and let the OM use any random value for src_color.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1. An apparatus to compile a shader comprising: logic, at least a portion of which is implemented in hardware, the logic to: determine whether a shader instruction can output a predetermined value; and compile the shader instruction to include an enhanced sub-sequence based on a determination that the shader instruction can output the predetermined value.

Example 2. The apparatus of example 1, the logic to compile the shader instruction omitting the enhanced sub-sequence based on a determination that the shader instruction cannot output the predetermined value.

Example 3. The apparatus of example 1, the logic to: evaluate at least one coordinate; and determine whether the shader instruction can output the predetermined value based on the at least one coordinate.

Example 4. The apparatus of example 1, wherein the shader instruction comprises a sample_c instruction, a mul_sat instruction, an add_sat instruction, a ld instruction, a sample instruction, an AND instruction, a greater than instruction, an equal to instruction, or a less than instruction.

Example 5. The apparatus of example 4, wherein the common value comprises one, zero, 1.0 f, 0.0 f, or the like.

Example 6. The apparatus of example 1, the logic to generate an enhanced shader based in part on compiling the shader instructions, the enhanced shader to: determine whether the output of the shader instruction equals the predetermined value; and execute a first sequence based on a determination that the output of the shader instruction equals the predetermined value; or execute a second sequence based on a determination that the output of the shader instruction does not equal the predetermined value, the second sequence requiring more graphics processing resources than the first sequence.

Example 7. The apparatus of example 1, the logic to: determine whether the shader instruction can be folded based on a determination that the shader instruction can output a predetermined value; and compile the shader instruction to include the enhanced sub-sequence based on a determination that the shader instruction can be folded.

Example 8. The apparatus of example 7, the logic to compile the shader instruction omitting the enhanced sub-sequence based on a determination that the shader instruction cannot be folded.

Example 9. The apparatus of example 1, the logic to: determine whether an output-merger (OM) state of the shader instruction is set to a src_alpha; and compile the shader instruction to include the enhanced sub-sequence based on a determination that the OM state is set to src_alpha.

Example 10. The apparatus of example 9, the logic to compile the shader instruction omitting the enhanced sub-sequence based on a determination that the OM state is not set to src_alpha.

Example 11. The apparatus of example 9, the logic to: determine whether an alpha-max corresponding to the shader instruction is equal to zero; and bind the shader based on a determination that the alpha_max corresponding to the shader instruction equals zero.

Example 12. The apparatus of example 1, wherein the compiled shaders comprise a pixel shader, a vertex shader, a depth shader, a fragment shader, a domain shader, a hull shader, a computer shader, or a geometry shader.

Example 13. A computing-implemented method comprising: determining whether a shader instruction can output a predetermined value; and compiling the shader instruction to include an enhanced sub-sequence based on a determination that the shader instruction can output the predetermined value.

Example 14. The method of example 13, comprising compiling the shader instruction omitting the enhanced sub-sequence based on a determination that the shader instruction cannot output the predetermined value.

Example 15. The method of example 13, comprising: evaluating at least one coordinate; and determining whether the shader instruction can output the predetermined value based on the at least one coordinate.

Example 16. The method of example 13, wherein the shader instruction comprises a sample_c instruction, a mul_sat instruction, an add_sat instruction, a ld instruction, a sample instruction, an AND instruction, a greater than instruction, an equal to instruction, or a less than instruction.

Example 17. The method of example 16, wherein the common value comprises one, zero, 1.0 f, 0.0 f, or the like.

Example 18. The method of example 13, comprising generating an enhanced shader based in part on compiling the shader instructions, the enhanced shader comprising: determining whether the output of the shader instruction equals the predetermined value; and executing a first sequence based on a determination that the output of the shader instruction equals the predetermined value; or executing a second sequence based on a determination that the output of the shader instruction does not equal the predetermined value, the second sequence requiring more graphics processing resources than the first sequence.

Example 19. The method of example 13, comprising: determining whether the shader instruction can be folded based on a determination that the shader instruction can output a predetermined value; and compiling the shader instruction to include the enhanced sub-sequence based on a determination that the shader instruction can be folded.

Example 20.
The method of example 19, comprising compiling the shader instruction omitting the enhanced sub-sequence based on a determination that the shader instruction cannot be folded.

Example 21. The method of example 13, comprising: determining whether an output-merger (OM) state of the shader instruction is set to a src_alpha; and compiling the shader instruction to include the enhanced sub-sequence based on a determination that the OM state is set to src_alpha.

Example 22. The method of example 21, comprising compiling the shader instruction omitting the enhanced sub-sequence based on a determination that the OM state is not set to src_alpha.

Example 23. The method of example 22, comprising: determining whether an alpha-max corresponding to the shader instruction is equal to zero; and binding the shader based on a determination that the alpha_max corresponding to the shader instruction equals zero.

Example 24. The method of example 13, wherein the compiled shaders comprise a pixel shader, a vertex shader, a depth shader, a fragment shader, a domain shader, a hull shader, a computer shader, or a geometry shader.

Example 25. An apparatus comprising means for performing the method of any of examples 13 to 24.

Example 26. At least one machine-readable storage medium comprising instructions that when executed by a computing device, cause the computing device to: determine whether a shader instruction can output a predetermined value; and compile the shader instruction to include an enhanced sub-sequence based on a determination that the shader instruction can output the predetermined value.

Example 27. The at least one machine-readable storage medium of example 26, comprising instructions that when executed by the computing device, cause the computing device to compile the shader instruction omitting the enhanced sub-sequence based on a determination that the shader instruction cannot output the predetermined value.

Example 28. The at least one machine-readable storage medium of example 26, comprising instructions that when executed by the computing device, cause the computing device to: evaluate at least one coordinate; and determine whether the shader instruction can output the predetermined value based on the at least one coordinate.

Example 29. The at least one machine-readable storage medium of example 26, wherein the shader instruction comprises a sample_c instruction, a mul_sat instruction, an add_sat instruction, a ld instruction, a sample instruction, an AND instruction, a greater than instruction, an equal to instruction, or a less than instruction.

Example 30. The at least one machine-readable storage medium of example 29, wherein the common value comprises one, zero, 1.0 f, 0.0 f, or the like.

Example 31. The at least one machine-readable storage medium of example 26, comprising instructions that when executed by the computing device, cause the computing device to generate an enhanced shader based in part on compiling the shader instructions, the enhanced shader to: determine whether the output of the shader instruction equals the predetermined value; and execute a first sequence based on a determination that the output of the shader instruction equals the predetermined value; or execute a second sequence based on a determination that the output of the shader instruction does not equal the predetermined value, the second sequence requiring more graphics processing resources than the first sequence.

Example 32. The at least one machine-readable storage medium of example 26, comprising instructions that when executed by the computing device, cause the computing device to: determine whether the shader instruction can be folded based on a determination that the shader instruction can output a predetermined value; and compile the shader instruction to include the enhanced sub-sequence based on a determination that the shader instruction can be folded.

Example 33. The at least one machine-readable storage medium of example 32, comprising instructions that when executed by the computing device, cause the computing device to compile the shader instruction omitting the enhanced sub-sequence based on a determination that the shader instruction cannot be folded.

Example 34. The at least one machine-readable storage medium of example 26, comprising instructions that when executed by the computing device, cause the computing device to: determine whether an output-merger (OM) state of the shader instruction is set to a src_alpha; and compile the shader instruction to include the enhanced sub-sequence based on a determination that the OM state is set to src_alpha.

Example 35. The at least one machine-readable storage medium of example 34, comprising instructions that when executed by the computing device, cause the computing device to compile the shader instruction omitting the enhanced sub-sequence based on a determination that the OM state is not set to src_alpha.

Example 36. The at least one machine-readable storage medium of example 34, comprising instructions that when executed by the computing device, cause the computing device to: determine whether an alpha-max corresponding to the shader instruction is equal to zero; and bind the shader based on a determination that the alpha_max corresponding to the shader instruction equals zero.

Example 37. The at least one machine-readable storage medium of example 26, wherein the compiled shaders comprise a pixel shader, a vertex shader, a depth shader, a fragment shader, a domain shader, a hull shader, a computer shader, or a geometry shader.

Example 38. At least one machine-readable storage medium comprising instructions that when executed by a graphics processing unit (GPU), cause the GPU to: evaluate at least one coordinate of pixel; execute a shader instruction based on the at least one coordinate; determiner whether an output of the shader instruction equals a predetermined value; and execute a first sequence based on a determination that the output equals the predetermined value; or execute an second sequence based on a determination that the output does not equal the predetermined value.

Example 39. The at least one machine-readable storage medium of example 38, comprising instruction that when executed by the GPU, wherein the shader instruction comprises a sample_c instruction, a mul_sat instruction, an add_sat instruction, a ld instruction, a sample instruction, an AND instruction, a greater than instruction, an equal to instruction, or a less than instruction.

Example 40. The at least one machine-readable storage medium of example 38, comprising instruction that when executed by the GPU, wherein the common value comprises one, zero, 1.0 f, 0.0 f, or the like.

What is claimed is:

1. An apparatus to compile a shader comprising:
   logic, at least a portion of which is implemented in hardware, the logic to:
   determine whether an output-merger (OM) state of a shader instruction is set to a src_alpha; and
   compile the shader instruction to include an optimized sub-sequence based on a determination that the OM state is set to src_alpha.

2. The apparatus of claim 1, the logic to:
   select the shader instruction that will output a value that matches a predetermined value, wherein the predetermined value comprises one, zero, 1.0 f, or 0.0 f; and
   compile the shader instruction to include the optimized sub-sequence based on selection of the shader instruction.

3. The apparatus of claim 2, the logic to:
   evaluate at least one coordinate; and
   determine whether the shader instruction can output the predetermined value based on the at least one coordinate.

4. The apparatus of claim 2, wherein the shader instruction comprises a sample_c instruction, a mul_sat instruction, an add_sat instruction, a ld instruction, a sample instruction, an AND instruction, a greater than instruction, an equal to instruction, or a less than instruction.

5. The apparatus of claim 2, the logic to generate an optimized shader based in part on compiling the shader instructions, the optimized shader to:
   determine whether the output of the shader instruction equals the predetermined value; and
   execute a first sequence based on a determination that the output of the shader instruction equals the predetermined value; and
   execute a second sequence based on a determination that the output of the shader instruction does not equal the predetermined value, the second sequence requiring more graphics processing resources than the first sequence.

6. The apparatus of claim 2, the logic to:
   determine whether the shader instruction can be folded based on a determination that the shader instruction can output the predetermined value; and
   compile the shader instruction to include the optimized sub-sequence based on a determination that the shader instruction can be folded.

7. The apparatus of claim 6, the logic to compile the shader instruction omitting the optimized sub-sequence based on a determination that the shader instruction cannot be folded.

8. The apparatus of claim 2, wherein the compiled shaders comprise a pixel shader, a vertex shader, a depth shader, a fragment shader, a domain shader, a hull shader, a computer shader, or a geometry shader.

9. The apparatus of claim 1, the logic to compile the shader instruction omitting the optimized sub-sequence based on a determination that the OM state is not set to src_alpha.

10. The apparatus of claim 1, the logic to:
    determine whether an alpha-max corresponding to the shader instruction is equal to zero; and
    bind the shader based on a determination that the alpha_max corresponding to the shader instruction equals zero.

11. A method comprising:
    determining whether an output-merger (OM) state of a shader instruction is set to a src_alpha; and
    compiling the shader instruction to include an optimized sub-sequence based on a determination that the OM state is set to src_alpha.

12. The method of claim 11, comprising:
    selecting the shader instruction that will output a value that matches a predetermined value, wherein the predetermined value comprises one, zero, 1.0 f, or 0.0 f; and
    compiling the shader instruction to include the optimized sub-sequence based on selection of the shader instruction.

13. The method of claim 12, comprising:
    evaluating at least one coordinate; and
    determining whether the shader instruction can output the predetermined value based on the at least one coordinate.

14. The method of claim 12, wherein the shader instruction comprises a sample_c instruction, a mul_sat instruction, an add_sat instruction, a ld instruction, a sample instruction, an AND instruction, a greater than instruction, an equal to instruction, or a less than instruction.

15. The method of claim 12, comprising:
  determining whether the shader instruction can be folded based on a determination that the shader instruction can output the predetermined value; and
  compiling the shader instruction to include the optimized sub-sequence based on a determination that the shader instruction can be folded.

16. The method of claim 15, comprising compiling the shader instruction omitting the optimized sub-sequence based on a determination that the shader instruction cannot be folded.

17. At least one non-transitory machine-readable storage medium comprising instructions that when executed by a computing device, cause the computing device to:
  determine whether an output-merger (OM) state of a shader instruction is set to a src_alpha; and
  compile the shader instruction to include an optimized sub-sequence based on a determination that the OM state is set to src_alpha.

18. The at least one non-transitory machine-readable storage medium of claim 17, comprising instructions that when executed by the computing device, cause the computing device to:
  select the shader instruction that will output a value that matches a predetermined value, wherein the predetermined value comprises one, zero, 1.0 f, or 0.0 f; and
  compile the shader instruction to include the optimized sub-sequence based on selection of the shader instruction.

19. The at least one non-transitory machine-readable storage medium of claim 18, comprising instructions that when executed by the computing device, cause the computing device to:
  evaluate at least one coordinate; and
  determine whether the shader instruction can output the predetermined value based on the at least one coordinate.

20. The at least one non-transitory machine-readable storage medium of claim 18, wherein the shader instruction comprises a sample_c instruction, a mul_sat instruction, an add_sat instruction, a ld instruction, a sample instruction, an AND instruction, a greater than instruction, an equal to instruction, or a less than instruction.

21. The at least one non-transitory machine-readable storage medium of claim 17, comprising instruction that when executed by the GPU, cause the GPU to:
  evaluate at least one coordinate of pixel;
  execute a shader instruction based on the at least one coordinate;
  determine whether an output of the shader instruction equals a value that matches a predetermined value, wherein the predetermined value comprises one, zero, 1.0 f, or 0.0 f; and
  execute a first sequence based on a determination that the output equals the predetermined value; and
  execute a second sequence based on a determination that the output does not equal the predetermined value.

22. The at least one non-transitory machine-readable storage medium of claim 21, comprising instruction that when executed by the GPU, wherein the shader instruction comprises a sample_c instruction, a mul_sat instruction, an add_sat instruction, a ld instruction, a sample instruction, an AND instruction, a greater than instruction, an equal to instruction, or a less than instruction.

* * * * *